United States Patent
Fiesler et al.

(10) Patent No.: US 6,851,732 B2
(45) Date of Patent: Feb. 8, 2005

(54) DEVICE FOR PULLING A LENGTH OF HOSE

(75) Inventors: Wallace Dale Fiesler, Glendale Heights, IL (US); Dennis Lewandowski, Addison, IL (US)

(73) Assignee: Better Enterprises, Inc., Wheaton, IL (US)

( * ) Notice: Subject to any disclaimer, the term of this patent is extended or adjusted under 35 U.S.C. 154(b) by 0 days.

(21) Appl. No.: 10/418,901

(22) Filed: Apr. 17, 2003

(65) Prior Publication Data

US 2003/0205906 A1 Nov. 6, 2003

Related U.S. Application Data

(60) Provisional application No. 60/376,447, filed on May 1, 2002.

(51) Int. Cl.[7] .................................................. B65G 7/12
(52) U.S. Cl. ......................................... 294/16; 294/902
(58) Field of Search .......................... 294/15, 16, 31.2, 294/145, 164, 165, 119.2, 902, 114

(56) References Cited

U.S. PATENT DOCUMENTS

| | | | | | |
|---|---|---|---|---|---|
| 1,058,926 A | * | 4/1913 | Toole | ........................... | 294/16 |
| 1,913,458 A | * | 6/1933 | Sederland | ..................... | 294/16 |
| 1,987,493 A | * | 1/1935 | Richards | ....................... | 294/16 |
| 3,231,955 A | * | 2/1966 | Taylor | ........................... | 24/279 |
| 4,795,202 A | * | 1/1989 | Mader | ........................... | 294/16 |
| 4,856,834 A | * | 8/1989 | Lancaster et al. | ............. | 294/15 |

* cited by examiner

*Primary Examiner*—Dean J. Kramer

(57) ABSTRACT

A device for gripping a hose includes an annular collar having an inner diameter large enough to slidably receive the hose there through and first and second gripping members pivotally mounted at diametrically opposite positions on the collar. Each of the gripping members has an elongate leg portion and a perpendicularly oriented foot portion pivotally mounted to the collar. The lower surfaces of the foot portions have ripples with crests spaced a distance apart equal to the spacings between adjacent ridges of the spiral on the hose to be retained.

3 Claims, 2 Drawing Sheets

US 6,851,732 B2

DEVICE FOR PULLING A LENGTH OF HOSE

The applicant claims priority from his previously filed co-pending provisional application filed May 1, 2002 and assigned Ser. No. 60/376,447 The present invention relates to a device to assist an operator in pulling a length of heavy hose and in particular to a tool to facilitate the handling of the hose used for pumping mud and sludge.

BACKGROUND OF THE INVENTION

The dirt from automobiles that is removed in a car wash facility passes through a grate into an eight foot deep mud pit below. Over time the pit fills with mud and periodically the accumulated mud and sludge must be pumped out of the bottom of the pit. Similarly, septic tanks have reservoirs for accumulating waste products in the form of sludge that cannot be absorbed into the surrounding ground and that sludge must also be periodically pumped out of the reservoir of the septic tank.

The mud and sludge which accumulates in septic tanks and in the pits below car washes is removed in tanks mounted on trucks, and the hoses used to pump the mud and sludge are stiff and relatively inflexible and have diameters ranging from a minimum of three inches to a maximum of eight inches. Such hose is so stiff and awkward that it is wrapped around the circumference of the truck for storage while being transported to the work site. During the course of pumping the mud from the bottom of a car wash pit, an operator must stand at the upper edge of the pit and dangle the free end of the hose into the mud as the pump on the truck sucks mud through the hose and into the tank on the truck bed. Because of its stiffness and relatively large diameter, typically six inches, the hose is very heavy and awkward.

To carry out his task, the operator must stand and dangle the length of the hose under his arm and by working his body against the length of the hose, manipulate the open end into the mud in the pit below him. The hose itself has a spiral or groove around its exterior so as to have ripples along its length, but the ripples are of narrow diameter and do not assist an operator in grasping the hose. The operator's task may be further complicated if the hose is wet. As a result of the above, the operator will exhaust great amounts of energy in carrying out his task and may subject himself to injury.

It would be desirable to provide a device that would facilitate the operator in controlling a dredging hose that would improve the operator's grip along the length of the hose.

BRIEF DESCRIPTION OF THE INVENTION

Briefly, the present invention embodies a device for pulling or holding a length of hose of the type used for pumping mud and sludge. The hose has an outer wall with a spiral ripple along the length thereof, the hose having a given diameter.

In accordance with the invention, an annular collar is provided having an inner diameter, which is larger than the given diameter of the hose so that the collar is easily slidable along the length thereof. Pivotally mounted at diametrically opposite positions on the collar are first and second gripping members. Each of the first and second gripping members consists of a first elongate leg portion adapted to be griped by the human hand, and at one end of the elongate leg, a perpendicularly oriented foot portion having a surface perpendicular to the length of the leg portion that is adapted to grip the wall of the hose. The first and second gripping members are mounted to the annular collar on pivot pins with the pivot of each gripping member positioned along the length of the leg portion and spaced a short distance from the bottom of the foot to thereby provide leverage for locking the foot against the outer wall of a length of hose.

BRIEF DESCRIPTION OF THE DRAWINGS

A better understanding of the present invention will be had after reading of the following detailed description taken in conjunction with the drawings wherein.

DETAILED DESCRIPTION OF A PREFERRED EMBODIMENT

Figure 1:
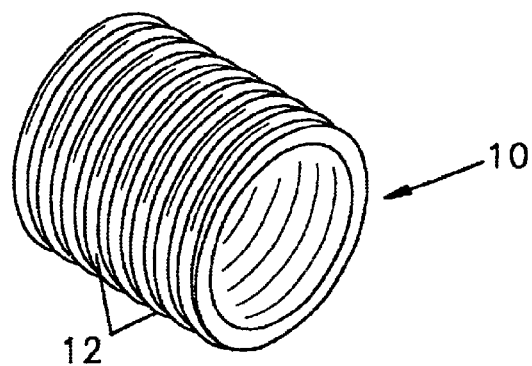
FIG. 1 is a fragmentary isometric view of a length of hose of the type used to pump mud and sludge.
Figure 2:
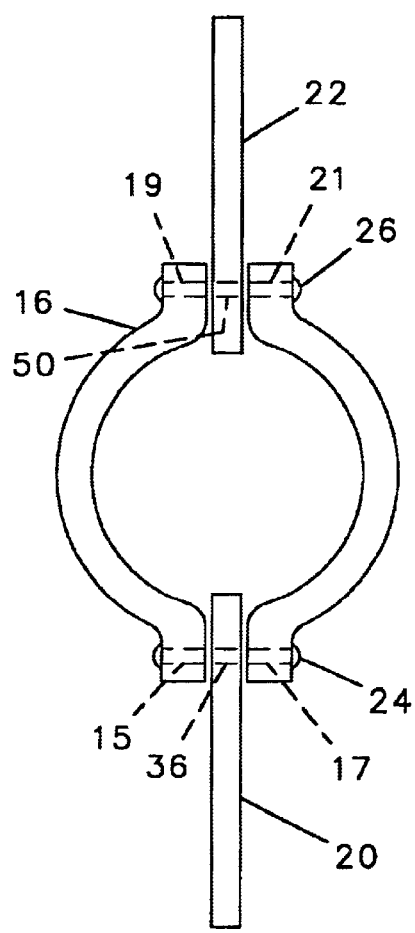
FIG. 2 is a front elevational view of the device of the present invention for pulling the hose shown in FIG. 1.

Referring to FIG. 1, a length of hose 10 of the type used in the pumping of mud and sludge typically has diameters of three inches, four inches, six inches or eight inches. The hose is made of a stiff rubber or the like has a ridge 12 that spirals around the outer surface much like the threads of a screw. Unlike the threads of a screw, however, the crest of the ridge 12 is rounded such that the spiral ridge 12 does little to enable an operator to grip the circumference of the hose 10.

Referring to FIGS. 2 through 6, to facilitate gripping the hose 10 a device 14 in accordance with the present invention has first and second complementary arcuate members 16, 18. Positioned between the arcuate members 16, 18 are moveable gripping members 20, 22. A first pivot pin 24, which may be in the form of a bolt and nut, extends through transverse holes 15, 17 at one end of the arcuate portions 16, 18, respectively, and through an aligned transverse hole in the first gripping member 20 and a second pivot pin 26 extends through complementary aligned holes 19, 21, respectively, in the opposite ends of the arcuate members 16, 18 and through a hole in the second gripping member 22. The pivot pins 24, 26 loosely retain the gripping members 20, 22 between the arcuate members 16, 18 such that each of the gripping members 20, 22 is easily pivoted about its respective pivot pin 24, 26.

The inner arcs 28, 30 of the arcuate members 16, 18 respectively define an opening the inner diameter of which is large that the outer diameter of the hose 10 such that the arcuate members 16, 18 form a collar which is easily slidable along the length of the hose 10.

Figure 6:
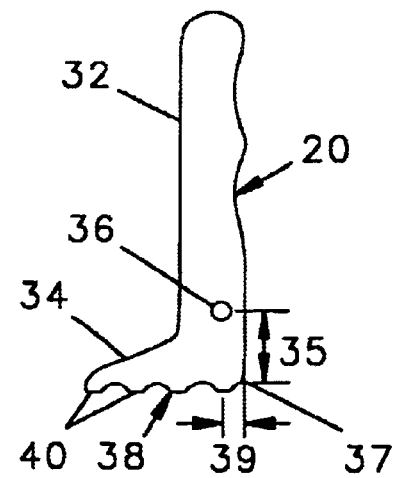
FIG. 6 is a side elevational view of a second gripping member of the device shown in FIG. 2.

Referring to FIG. 6 the first gripping member 20 has shape that resembles an "L" or in some respects resembles a human lower leg and foot including an elongate leg portion 32 at the lower end of which is a transverse foot portion 34. The foot portion further has a rippled lower surface 38 with the crests 40—40 of the ripples spaced a distance apart equal to the spacings of the ridges 12 of the hose 10. The rippled lower service 38 is depicted as having four crests 40—40 with the first crest positioned at the heel and the last crest positioned at the toe of the foot portion 34.

Positioned along the length of the leg portion 32, roughly in the position a human ankle, is a transverse hole 36 through which the first pivot pin 24 is fitted to retain the first gripping member between the arcuate members 16, 18. It should be appreciated that the hole 36 is spaced a distance 35 from the heel 37, along the length of the leg portion 32, that is greater than the distance 39 from the heel 37, along the foot portion 34, for providing leverage in locking and unlocking the gripping member 20 against the wall of the hose 10.

Figure 5:
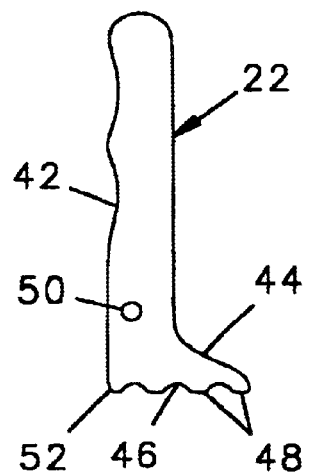
FIG. 5 is a side elevational view of a first gripping member of the device shown in FIG. 2.

Referring to FIG. 5 the second gripping member 22 also has the general appearance of a capital letter "L" or of a human foot consisting of a leg portion 42 and a transverse foot portion 44 having a rippled lower surface 46. The rippled lower surface 46 again has a plurality of crests 48—48 of which three are depicted, and the distance between adjacent crests 48—48 is equal to the distance between adjacent ridges 12 of the hose 10. The second gripping portion also has a hole 50 through which pivot pin 26 extends, the hole 50 positioned at the ankle and spaced from the heel 52 as explained with respect to hole 36 of the first gripping member 20.

The positioning of the crests 48—48 on the lower surface 46 differs from the positioning of the crests 40—40 on the lower surface 38 of the first gripping member 20 in that the crest 48 nearest the heel is offset from the end of the heel by a distance equal to one half of the distance between adjacent spiral ridges 12 of the hose 10.

Figure 3:
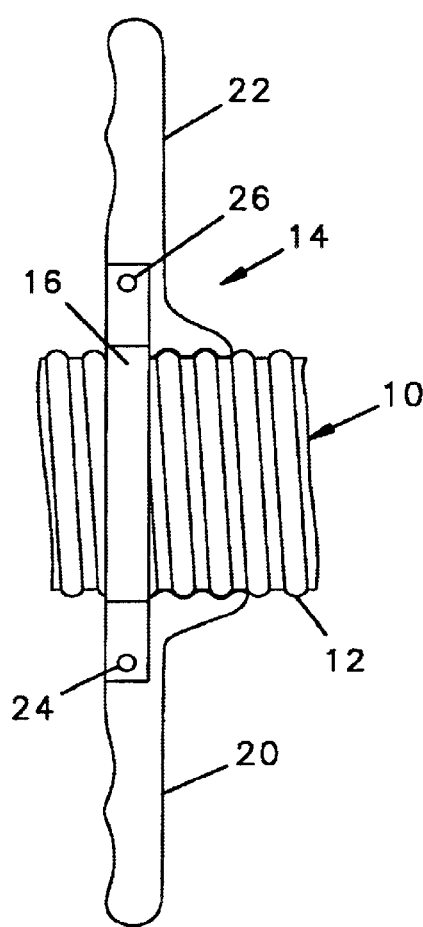
FIG. 3 is a side elevational view of the device shown in FIG. 2 fitted around the hose shown in FIG. 1 with the gripping members locked against the outer wall length of the hose.

Referring to FIG. 3, the collar formed by arcuate members 16, 18 can be fitted around the end of the length hose 10 and locked against the surface thereof by positioning the gripping members 20, 22 with the lower surfaces 38, 46 abutting the outer surface of the hose 10 with the crests 40, 48 of the surfaces 38, 46 respectively positioned between the ridges 12 of the hose 10 as shown. With the gripping members 20, 22 in this orientation, an operator can hold the leg portions 32, 42 as handles and twist the gripping member 20, 22 about their respective pivot pins 24, 26 to keep the rippled surfaces 38, 46 against the outer wall of the hose 10.

Figure 4:
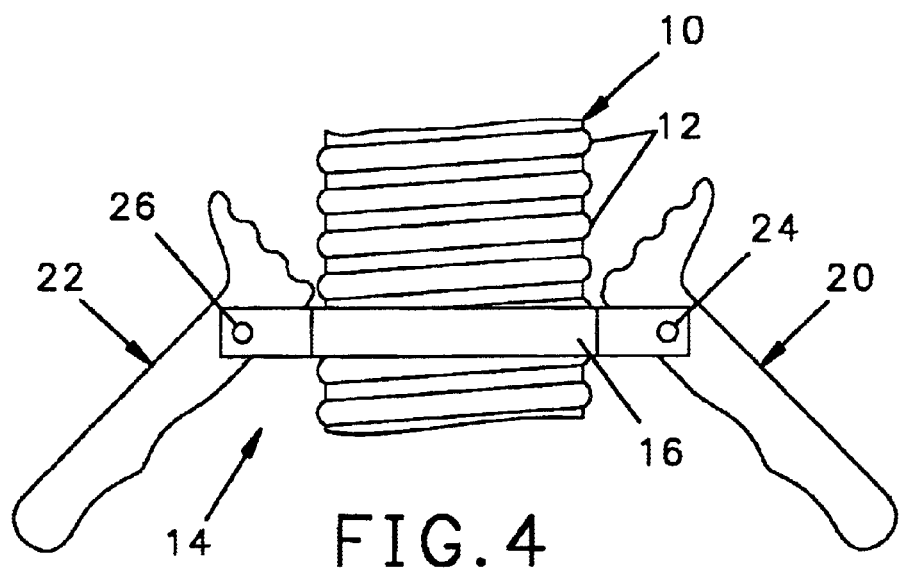
FIG. 4 is a side elevational view of the device shown in FIG. 2 fitted around the hose of FIG. 1 with the gripping members in a release position with respect to the walls of the hose.

Referring to FIG. 4 to move the device 14 with respect to hose 10 the operator will use the handle legs 32, 42, to twist the gripping members 20, 22 about their respective pivot pins 24, 26 to rotate the lower surfaces 38, 46 away from the spiral ridges 12 of the hose 10, thereby allowing the collar formed by the arcuate members 16, 18 to be longitudinally moved along the length of the hose 10 to a new position. Once the device is repositioned, the leg handles 32, 42 are again rotated about their respective pivot pins 24, 26 until the rippled surfaces 38, 46 again engage the spiral ridges 12 of the hose 10 as shown in FIG. 3.

The device 14 may be made out of any suitable material although the applicant has found that the parts can be satisfactorily cut from ¾ inch aluminum sheet.

while the present invention has been described with respect to a single embodiment it will be appreciated that there are many modifications and variations that fall within the spirit of the invention. It is therefore the intent of the appended claims to cover all the variations and modifications that fall within the spirit and scope of the invention.

What is claimed:

1. A device for pulling a length of hose of the type used for pumping liquid, said hose having a given diameter and an outer wall, said outer wall having a plurality of generally annular ridges circling a circumference thereof wherein adjacent ridges have a given spacing there between, said device comprising an annular collar having an opening with an inner diameter larger than said given diameter so as to slideably receive said hose therethrough, a first gripping member pivotally mounted on said collar and a second gripping member mounted on said collar spaced from said first gripping member, said first and said second gripping members each having a leg having a longitudinal axis, said leg adapted to be gripped by a human hand, said first and said second gripping members each having a gripping surface adapted to grip said wall of said hose, said gripping surface of said first gripping member being generally perpendicular the said axis of said leg of said first gripping member, and said gripping surface of one of said first and second gripping members having ripples wherein said ripples have crests with the spacings between adjacent crests of said ripples being equal to said given spacing between said ridges.

2. The device of claim 1 wherein said first gripping member is positioned on said annular collar diametrically apart from said second gripping member.

3. The device of claim 1 wherein said first gripping member has a second leg generally perpendicular to said leg, said second leg having said gripping surface thereon.

* * * * *